United States Patent
Sung et al.

(10) Patent No.: US 10,266,626 B2
(45) Date of Patent: Apr. 23, 2019

(54) ETHYLENE/ALPHA-OLEFIN COPOLYMER HAVING EXCELLENT PROCESSABILITY AND SURFACE CHARACTERISTICS

(71) Applicant: LG CHEM, LTD., Seoul (KR)

(72) Inventors: Yu Taek Sung, Daejeon (KR); Soon Ho Sun, Daejeon (KR); Sol Cho, Daejeon (KR); Yi Young Choi, Daejeon (KR); Ki Soo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 7 days.

(21) Appl. No.: 15/549,103

(22) PCT Filed: Apr. 12, 2016

(86) PCT No.: PCT/KR2016/003848
§ 371 (c)(1),
(2) Date: Aug. 4, 2017

(87) PCT Pub. No.: WO2016/167548
PCT Pub. Date: Oct. 20, 2016

(65) Prior Publication Data
US 2018/0030180 A1    Feb. 1, 2018

(30) Foreign Application Priority Data

Apr. 13, 2015  (KR) .................. 10-2015-0051831
Mar. 30, 2016  (KR) .................. 10-2016-0038476

(51) Int. Cl.
C08F 210/16    (2006.01)
C08F 4/6592    (2006.01)
C08F 4/659     (2006.01)

(52) U.S. Cl.
CPC .......... *C08F 210/16* (2013.01); *C08F 4/6592* (2013.01); *C08F 4/65908* (2013.01); *C08F 4/65912* (2013.01); *C08F 4/65916* (2013.01); *C08F 4/65925* (2013.01); *C08F 4/65927* (2013.01); *C08F 2420/02* (2013.01); *C08F 2420/06* (2013.01)

(58) Field of Classification Search
CPC .............. C08F 210/16; C08F 4/65927; C08F 4/65908; C08F 4/65912; C08F 4/65916
See application file for complete search history.

(56) References Cited

U.S. PATENT DOCUMENTS

| | | |
|---|---|---|
| 4,614,764 A | 9/1986 | Colombo et al. |
| 4,935,474 A | 6/1990 | Ewen et al. |
| 5,914,289 A | 6/1999 | Razavi |
| 6,828,394 B2 | 12/2004 | Vaughan et al. |
| 6,841,631 B2 | 1/2005 | Loveday et al. |
| 6,894,128 B2 | 5/2005 | Loveday et al. |
| 6,933,353 B2 | 8/2005 | Wang |
| 7,875,690 B2 | 1/2011 | Graham et al. |
| 2010/0105839 A1 | 4/2010 | Mehta |
| 2010/0113698 A1 | 5/2010 | Walton et al. |
| 2010/0222529 A1 | 9/2010 | Michel et al. |
| 2011/0032621 A1 | 2/2011 | Marchand et al. |
| 2011/0217499 A1 | 9/2011 | Mannebach et al. |
| 2012/0010375 A1 | 1/2012 | Yang et al. |
| 2014/0171582 A1 | 6/2014 | Wang et al. |
| 2014/0213734 A1 | 7/2014 | Jiang |
| 2014/0349050 A1 | 11/2014 | Maziers |
| 2015/0239996 A1 | 8/2015 | Funaya et al. |
| 2016/0168281 A1 | 6/2016 | Lee et al. |

FOREIGN PATENT DOCUMENTS

| | | |
|---|---|---|
| EP | 3168243 A1 | 5/2017 |
| JP | 2017-526773 A | 9/2017 |
| KR | 10-2004-0076965 A | 9/2004 |
| KR | 10-2010-0134571 A | 12/2010 |
| KR | 10-2011-0066961 A | 6/2011 |
| KR | 10-2013-0113322 A | 10/2013 |
| KR | 10-2015-0015789 A | 2/2015 |
| KR | 10-2015-0037520 A | 4/2015 |
| WO | 2004/076502 A1 | 9/2004 |
| WO | 2014050817 A1 | 4/2014 |

OTHER PUBLICATIONS

Bensason, et al.: "Classification of Homogeneous Ethylene-Octene Copolymers Based on Comonomer Content", Journal of Polymer Science: Part B: Polymer Physics, vol. 34, 1996, pp. 1301-1315.
Defoor, et al.: "Molecular, Thermal, and Morphological Characterization of Narrowly Branched Fractions of 1-Octene Linear Low-Density Polyethylene. 3. Lamellar and Spherulitic Morphology", Macromolecules, American Chemical Society, vol. 26, 1993, pp. 2575-2582.
Isasi, et al.: "Some aspects of the crystallization of ethylene copolymers", Polymer, Elsevier, vol. 41, 2000, pp. 8813-8823.

*Primary Examiner* — Caixia Lu
(74) *Attorney, Agent, or Firm* — Dentons US LLP

(57) ABSTRACT

The present invention relates to an ethylene/alpha-olefin copolymer. The ethylene/alpha-olefin copolymer according to the present invention has excellent processability and surface characteristics and thus can be usefully applied to various products.

7 Claims, 3 Drawing Sheets

[FIG. 1]
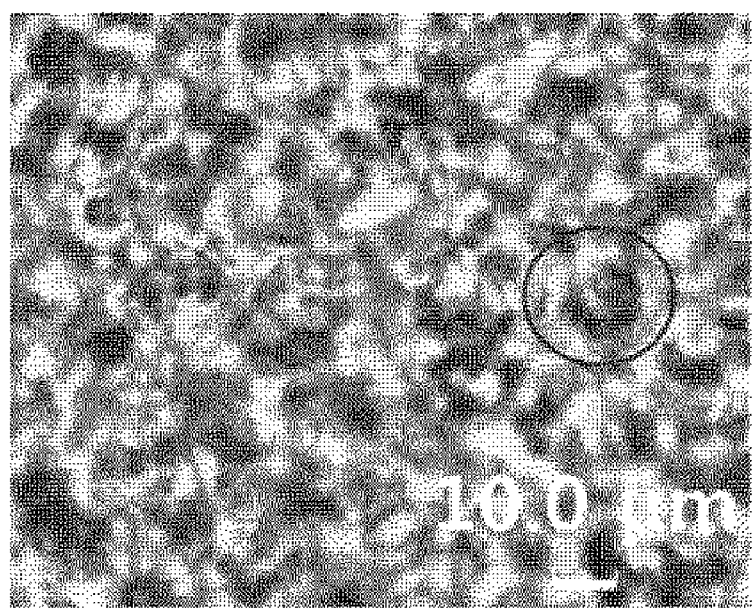

[FIG. 2]
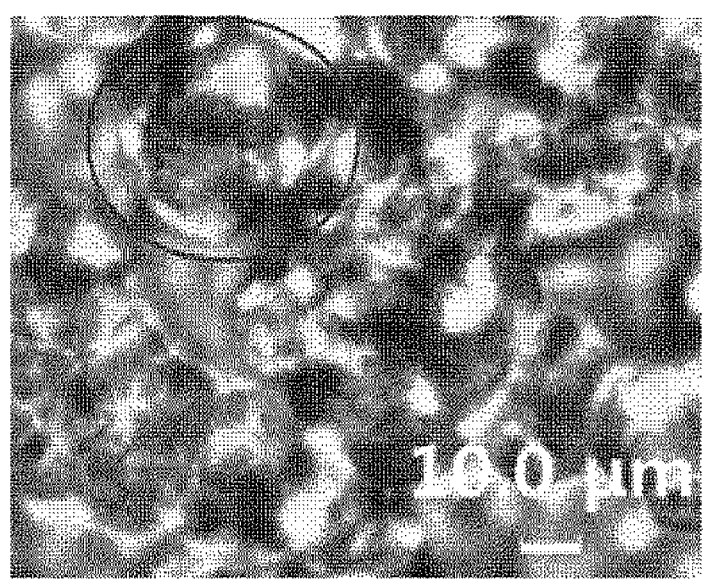

[FIG. 3]
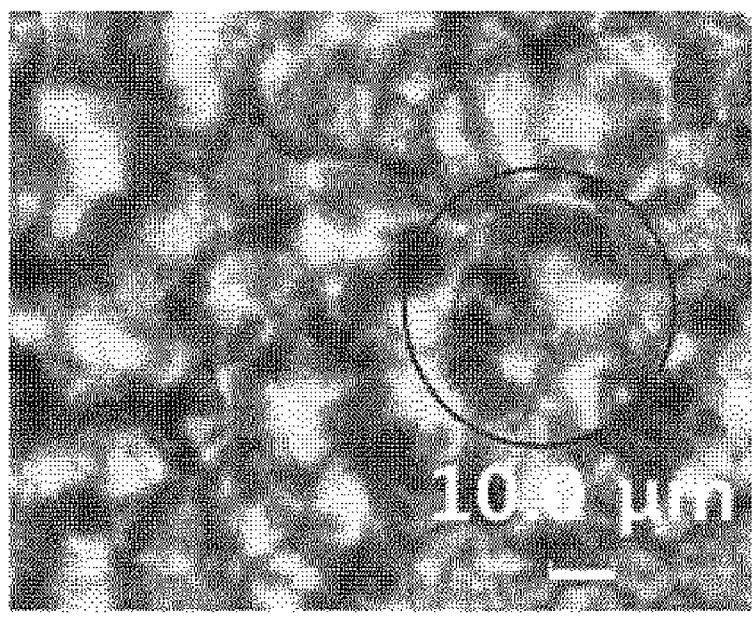

ETHYLENE/ALPHA-OLEFIN COPOLYMER HAVING EXCELLENT PROCESSABILITY AND SURFACE CHARACTERISTICS

CROSS-REFERENCE TO RELATED APPLICATION(S)

This application is a National Stage Application of International Application No. PCT/KR2016/003848, filed Apr. 12, 2016, and claims the benefit of Korean Patent Application No. 10-2016-0038476, filed Mar. 30, 2016, and Korean Patent Application No. 10-2015-0051831, filed Apr. 13, 2015 contents of which are incorporated herein by reference in their entirety for all purposes as if fully set forth below.

TECHNICAL FIELD

The present invention relates to an ethylene/alpha-olefin copolymer having excellent processability and surface characteristics.

BACKGROUND ART

Olefin polymerization catalyst systems can be classified into Ziegler-Natta and metallocene catalyst systems, and these two highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that molecular weight distribution of polymers is broad. Also, since compositional distribution of comonomers is not uniform, there is a problem that it has a limitation to secure the desired physical properties.

Meanwhile, the metallocence catalyst comprises a combination of a main catalyst whose main component is a transition metal compound, and an organometallic compound cocatalyst whose main component is aluminium. Such a catalyst is a single-site catalyst which is a homogeneous complex catalyst, and offers a polymer having a narrow molecular weight distribution and an uniform composition distribution of comonomers, depending on the single site characteristics. The metallocene catalyst has characteristics which can control the stereoregularity, copolymerizing properties, molecular weight, crystallinity and the like of the resulting polymer by changing the ligand structure of the catalyst and the polymerization condition.

U.S. Pat. No. 5,914,289 discloses a method of controlling the molecular weight and the molecular weight distribution of polymers using metallocene catalysts which are respectively supported on supports. However, a large amount of solvent and a long period of time are required to prepare the supported catalysts, and the process of supporting metallocene catalysts on the respective supports is troublesome.

Korean Patent Application No. 10-2003-0012308 discloses a method of controlling the molecular weight distribution of polymers by supporting a bi-nuclear metallocene catalyst and a mononuclear metallocene catalyst on a support with an activator, thus changing a combination of catalysts in a reactor and performing polymerization. However, this method has a limitation to achieve the properties of the respective catalysts simultaneously. In addition, there is a disadvantage that a metallocene catalyst portion is departed from a supported component of the catalyst to cause fouling in the reactor.

Therefore, in order to solve the above-mentioned disadvantages, there is a need to develop a method for preparing olefinic polymers with the desired physical properties by easily preparing a supported hybrid metallocene catalyst having an excellent activity.

On the other hand, a linear low density polyethylene is produced by copolymerizing ethylene and alpha olefin using a polymerization catalyst under low pressure. Thus, this is a resin having a narrow molecular weight distribution and a certain length of a short chain branch, without a long chain branch. The linear low density polyethylene film has high strength and elongation at break in addition to the properties of a general polyethylene and exhibits excellent tear strength, falling weight impact strength or the like. This has led to an increase in the use of a stretch film, an overlapping film or the like which is difficult to apply existing low density polyethylene or high density polyethylene.

However, the linear low density polyethylene using 1-butene or 1-hexene as a comonomer is mostly prepared in a single gas phase reactor or a single loop slurry reactor, and has a high productivity compared to a process using 1-octene comonomer. However, these products have limitations in the catalyst technology and process technology. Thus, they are problematic in that their physical properties are greatly inferior to when using 1-octene comonomer, and the molecular weight distribution is narrow, resulting in poor processability. Many studies have been conducted to improve these problems.

U.S. Pat. No. 4,935,474, describes a process for preparing polyethylene having a broad molecular weight distribution by using two or more metallocene compounds. U.S. Pat. No. 6,828,394 discloses a process for producing polyethylene which is excellent in processability and particularly suitable for a film, by using a catalyst system comprising a poor comonomer incorporating catalyst compound and a good comonomer incorporating catalyst compound. In addition, U.S. Pat. Nos. 6,841,631 and 6,894,128 describe that polyethylene having a bimodal or multimodal molecular weight distribution is produced by using a metallocene-type catalyst including at least two metal compounds, and thus it can be used in various applications such as film, blowing and molding, and pipe. However, although these products have improved processability, there is still a problem that the dispersed state per molecular weight within unit particles is not uniform, and thus the extruded appearance is rough even under relatively good extrusion condition and the physical properties are not stable.

Given the above circumstances, there is a continuing need for the production of superior products having a balance between physical properties and processability. In particular, the necessity of a polyethylene copolymer having excellent processability is further required.

DETAILED DESCRIPTION OF THE INVENTION

Technical Problem

In order to solve the problems of the prior arts, it is an object of the present invention to provide an ethylene/alpha-olefin copolymer having excellent environmental stress cracking resistance.

Technical Solution

In order to achieve the above objects, the present invention provides an ethylene/alpha-olefin copolymer which satisfies the following conditions:

a weight average molecular weight (g/mol) of 50,000 to 150,000, a molecular weight distribution (Mw/Mn) of 3 to 8, a density (g/cm$^3$) of 0.940 to 0.970, a diameter of spherulite of 20 µm or less, and a half crystallization time of 6 minutes or less measured at 123° C.

Ethylene/alpha-copolymers are semi-crystalline polymers, and the surface characteristics of these polymers are mainly influenced by the crystal structure. Most of the polymer chains are not linearly spread, but exist in a shape that is folded at a short distance. The folded chains gathers into bundles to form lamellae, and the spherulite is formed by the three-dimensional growth of the lamella. In particular, such spherulite has a great influence on the surface characteristics of the polymer. Reduction of spherulite size can impart better surface characteristics of the polymer.

The structure of the spherulite is influenced by various factors such as the molecular weight of polymer, the molecular weight distribution, the amount of comonomer, and the comonomer distribution. Generally, it is known that as the molecular weight of polymer increases and the amount of comonomer increases, the size of the spherulite decreases. However, in this case, the melt index, density and the like are increased, and thus a polymer having desired properties cannot be produced.

On the other hand, the crystallization speed of the polymer is related to the processability of the polymer, and the faster the crystallization speed, the more advantageous the processing of the polymer. In addition, if the crystallization speed is high, the size of crystals can be miniaturized and thus the size of the spherulite can be reduced.

In this regard, the present invention is characterized in that the generation of LCB (Long Chain Branch) is induced in the ethylene/alpha-olefin copolymer using a catalyst to be described later, thereby reducing the size of the spherulite and increasing the crystallization speed. Specifically, the ethylene/alpha-olefin copolymer according to the present invention is characterized in that the diameter of the spherulite is 20 µm or less and the half crystallization time measured at 123° C. is 6 minutes or less, preferably 5 minutes or less.

As in the embodiment of the present invention to be described later, the diameter of the spherulite can be measured by observing the surface of the ethylene/alpha-olefin copolymer with a microscope or the like. Specifically, the diameter of the spherulite is measured after the ethylene/alpha-olefin copolymer has been completely melted at 190° C. and then reached the crystallization temperature at a speed of 10° C./min. Herein, the diameter of the spherulite is the size when each spherulite overlaps according to the growth of the spherulite.

In addition, the half crystallization time is measured using a differential scanning calorimetry (DSC), and is the time when it is a half of the peak value in the heat quantity that appears after the ethylene/alpha-olefin copolymer is completely melted at 190° C., then quenched (80° C./min) up to a crystallization temperature (123° C.) and maintained for 1 hour.

According to an embodiment of the present invention, when the generation of LCB (Long Chain Branch) was induced in an ethylene/alpha-olefin copolymer using a catalyst to be described later, the size of the spherulite was remarkably small compared with the case where it was not, and the half crystallization speed was remarkably faster than that of the ethylene/alpha-olefin copolymer having the same molecular weight.

Further, preferably, MFRR$_{2.16}$ of the ethylene/alpha-olefin copolymer (melt flow index measured at 190° C. under a lead of 2.16 kg according to ASTM D 1238) is 0.5 to 10, more preferably 4 to 8.

Further, preferably, MFRR$_{5/2.16}$ of the ethylene/alpha-olefin copolymer (value where the melt flow index measured at 190° C. under a load of 5 kg is divided by the melt flow index measured at 190° C. under a lead of 2.16 kg according to ASTM D 1238) is 3 to 8, more preferably 3 to 4.

In the ethylene/alpha-olefin copolymer according to the present invention, specific examples of the alpha-olefin monomer include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene and the like, and two or more of these can also be used. Preferably, 1-butene can be used as the alpha-olefin monomer.

In the ethylene/alpha-olefin copolymer, the content of the alpha-olefin as the comonomer is not particularly limited, and may be appropriately selected depending on the use, purpose and the like of the copolymer. More specifically, it may be more than 0 mol % and less than 99 mol %.

The ethylene/alpha-olefin copolymer as described above can be produced using a metallocene catalyst. The metallocene catalyst that can be used may be a mixture of one or more first metallocene compounds represented by Chemical formula 1 below; and one or more second metallocene compounds selected from the compounds represented by the Chemical Formulas 3 to 5 below:

[Chemical Formula 1]

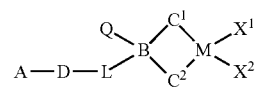

in Chemical Formula 1,

A is hydrogen, halogen, C$_{1-20}$ alkyl, C$_{2-20}$ alkenyl, C$_{6-20}$ aryl, C$_{7-20}$ alkylaryl, C$_{7-20}$ arylalkyl, C$_{1-20}$ alkoxy, C$_{2-20}$ alkoxyalkyl, C$_{3-20}$ heterocycloalkyl, or C$_{5-20}$ heteroaryl;

D is —O—, —S—, —N(R)— or —Si(R)(R')— wherein R and R' are the same as or different from each other and each independently hydrogen, halogen, C$_{1-20}$ alkyl, C$_{2-20}$ alkenyl, or C$_{6-20}$ aryl;

L is C$_{1-10}$ linear or branched alkylene;

B is carbon, silicon or germanium;

Q is hydrogen, halogen, C$_{1-20}$ alkyl, C$_{2-20}$ alkenyl, C$_{6-20}$ aryl, C$_{7-20}$ alkylaryl or C$_{7-20}$ arylalkyl;

M is a Group 4 transition metal;

X$^1$ and X$^2$ are the same as or different from each other and are each independently halogen, C$_{1-20}$ alkyl, C$_{2-20}$ alkenyl, C$_{6-20}$ aryl, nitro, amido, C$_{1-20}$ alkylsilyl, C$_{1-20}$ alkoxy, or C$_{1-20}$ sulfonate;

C$^1$ and C$^2$ are the same as or different from each other and each independently represented by one of the following chemical formulas 2a, 2b or 2c, provided that cases where both C$^1$ and C$^2$ are Chemical Formula 2c, are excluded,

[Chemical Formula 2a]

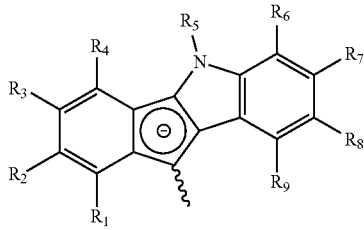

[Chemical Formula 2b]

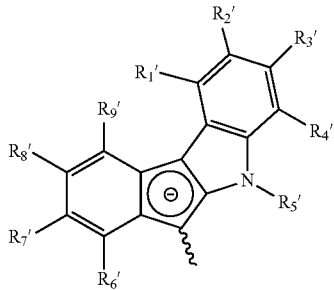

[Chemical Formula 2c]

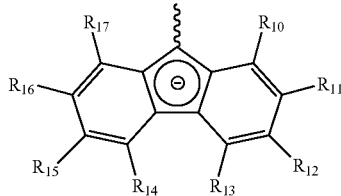

in Chemical Formulas 2a, 2b and 2c, $R_1$ to $R_{17}$ and $R_1'$ to $R_9'$ are same as or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-20}$ alkylaryl, or $C_{7-20}$ arylalkyl, and adjacent two or more of the $R_{10}$ to $R_{17}$ are connected to each other to form a substituted or unsubstituted aliphatic or aromatic ring;

$$(Cp^1R^a)_n(Cp^2R^b)M^1Z^1{}_{3-n}$$ [Chemical Formula 3]

in Chemical Formula 3, $M^1$ is a Group 4 transition metal;

$Cp^1$ and $Cp^2$ are the same as or different from each other and are each independently any one selected from the group consisting of cyclopentadienyl, indenyl, 4,5,6,7-tetrahydro-1-indenyl, and fluorenyl radicals, which may be substituted with a hydrocarbon having 1 to 20 carbon atoms;

$R^a$ and $R^b$ are the same as or different from each other and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z_1$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

n is 1 or 0;

$$(Cp^3R^c)_mB^1(Cp^4R^d)M^2Z^2{}_{3-m}$$ [Chemical Formula 4]

in Chemical Formula 4, $M^2$ is a Group 4 transition metal;

$Cp^3$ and $Cp^4$ are the same as or different from each other and are each independently any one selected from the group consisting of cyclopentadienyl, indenyl, 4,5,6,7-tetrahydro-1-indenyl and fluorenyl radicals, which may be substituted with a hydrocarbon having 1 to 20 carbon atoms;

$R^c$ and $R^d$ are the same as or different from each other and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^2$ is a halogen atom, $C_{1-20}$ alkyl, $C_{2-10}$ alkenyl, $C_{7-40}$ alkyl aryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^1$ is at least one of carbon, germanium, silicon, phosphorus, or nitrogen atom containing radicals, which cross-link $Cp^3R^c$ ring and $Cp^4R^d$ ring or which cross-link one $Cp^4R^d$ ring to $M^2$, a combination thereof;

m is 1 or 0;

$$(Cp^5R^e)B^2(J)M^3Z^3{}_2$$ [Chemical Formula 5]

in Chemical Formula 5, $M^3$ is a Group 4 transition metal;

$Cp^5$ is any one selected from the group consisting of cyclopentadienyl, indenyl, 4,5,6,7-tetrahydro-1-indenyl and fluorenyl radicals, which may be substituted with a hydrocarbon having 1 to 20 carbon atoms;

$R^e$ is hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^3$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^2$ is at least one of carbon, germanium, silicon, phosphorus, or nitrogen atom containing radicals, which cross-link $Cp^5R^e$ ring and J, or a combination thereof;

J is any one selected from the group consisting of $NR^f$, O, $PR^f$ and S, and the $R^f$ is $C_{1-20}$ alkyl, aryl, substituted alkyl or substituted aryl.

The substituents of Chemical Formulas 1, 3, 4 and 5 will be more specifically described as follows.

The $C_{1-20}$ alkyl includes a linear or branched alkyl and specific examples thereof include methyl, ethyl, propyl, isopropyl, n-butyl, tert-butyl, pentyl, hexyl, heptyl, octyl and the like, but are not limited thereto.

The $C_{2-20}$ alkenyl includes a linear or branched alkenyl, and specific examples thereof include allyl, ethenyl, propenyl, butenyl, pentenyl and the like, but are not limited thereto.

The $C_{6-20}$ aryl includes a monocyclic or fused ring-type aryl, and specific examples thereof include phenyl, biphenyl, naphthyl, phenanthrenyl, fluorenyl and the like, but are not limited thereto.

The $C_{5-20}$ heteroaryl includes a monocyclic or fused ring-type heteroaryl, and specific examples thereof include carbazolyl, pyridyl, quinoline, isoquinoline, thiophenyl, furanyl, imidazole, oxazolyl, thiazolyl, triazine, tetrahydro pyranyl, tetrahydrofuranyl and the like, but are not limited thereto.

The $C_{1-20}$ alkoxy include methoxy, ethoxy, phenyloxy, cyclohexyloxy and the like, but are not limited thereto.

Examples of the Group 4 transition metal include titanium, zirconium, hafnium and the like, but are not limited thereto.

$R_1$ to $R_{17}$ and $R_1'$ to $R_9'$ in the chemical formulas 2a, 2b and 2c are each independently hydrogen, methyl, ethyl, propyl, isopropyl, n-butyl, tert-butyl, pentyl, hexyl, heptyl, octyl, phenyl, halogen, trimethylsilyl, triethylsilyl, tripropylsilyl, tributylsilyl, triisopropylsilyl, trimethylsilylmethyl, methoxy or ethoxy, but are not limited thereto.

The L in Chemical Formula 1 is more preferably a linear or branched $C_{4-8}$ alkylene, but is not limited thereto. Also, the alkylene group may be substituted or unsubstituted with $C_{1-20}$ alkyl, $C_{2-20}$ alkenyl, or $C_{6-20}$ aryl.

In addition, A in Chemical Formula 1 is preferably hydrogen, methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, or tetrahydrofuranyl, but is not limited thereto.

Further, B in Chemical Formula 1 is preferably silicon, but it is not limited thereto.

The first metallocene compound of Chemical Formula 1 forms a structure in which an indeno indole derivative and/or a fluorene derivative is crosslinked via a bridge, and has an unshared electron pair which can act as a Lewis base in the ligand structure, thereby exhibiting a high polymerization activity even when supported on a surface having a Lewis acid property of a support. In addition, by including an indeno indole group and/or a fluorene group which is electronically rich, the activity is high, and due to an appropriate steric hindrance and an electronic effect of the ligand, not only hydrogen reactivity is low but also the high activity is maintained even in the presence of hydrogen. Further, the beta-hydrogen of the polymer chain where the nitrogen atom of the indenoindole derivative grows is stabilized by hydrogen bonding, to inhibit beta-hydrogen elimination, thereby polymerizing an ultra-high molecular weight olefin polymer.

According to one embodiment of the present invention, a specific example of the structure represented by Chemical Formula 2a may include a structure represented by any one of the following structural formulas, but the present invention is not limited thereto.

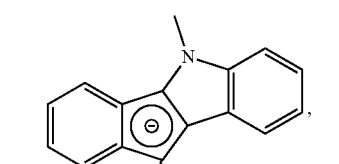

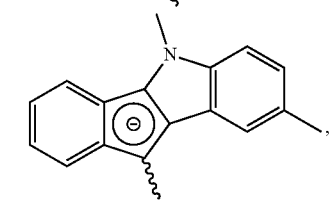

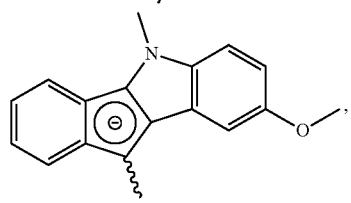

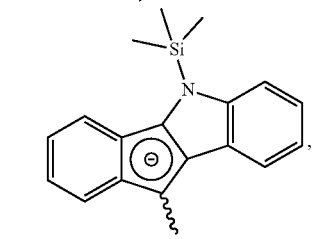

-continued

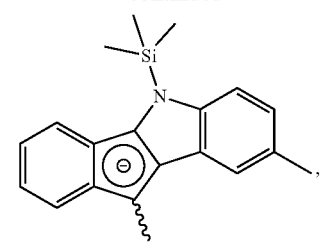

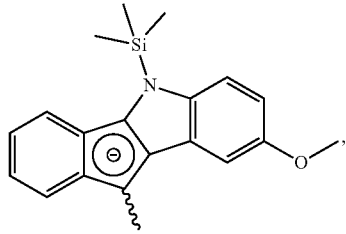

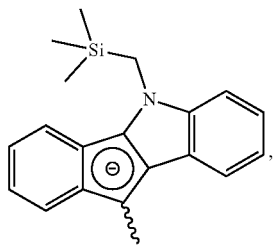

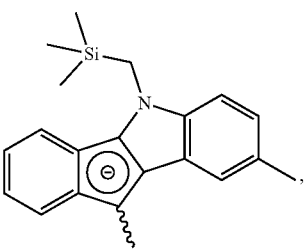

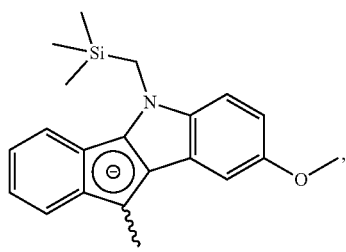

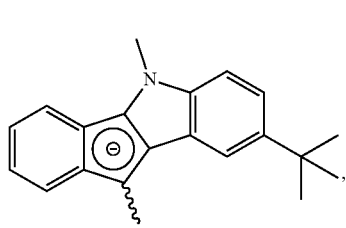

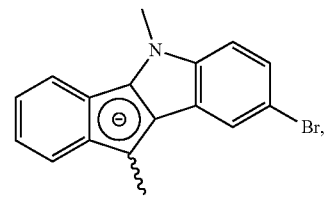

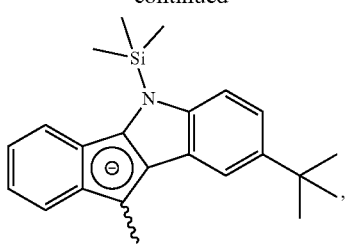
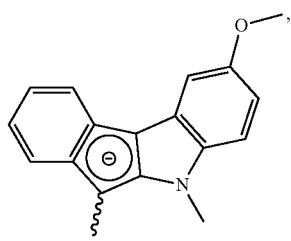
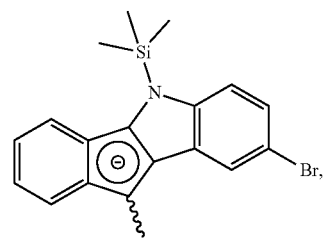
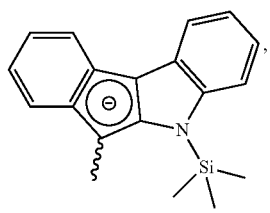
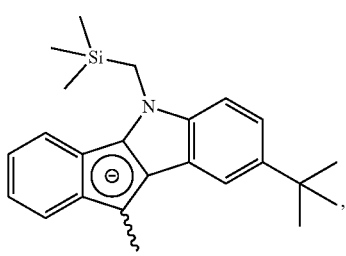
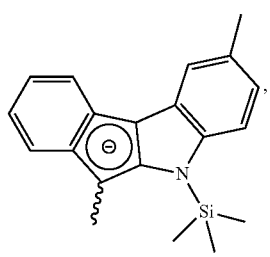
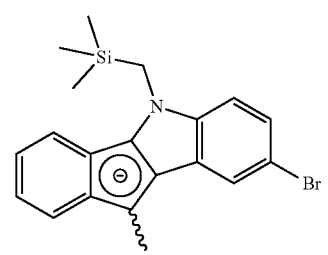
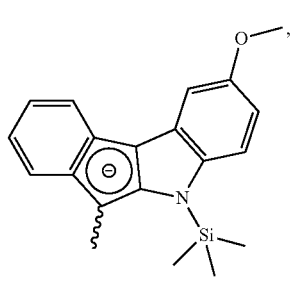
According to one embodiment of the present invention, a specific example of the structure represented by Chemical Formula 2b may include a structure represented by one of the following structural formulas, but the present invention is not limited thereto.
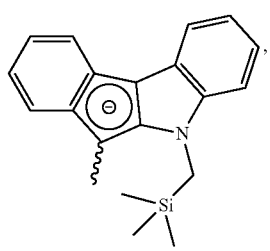
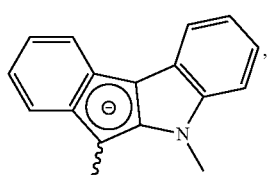
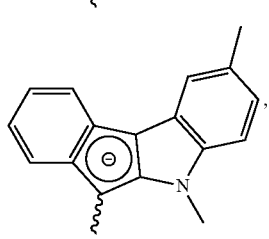
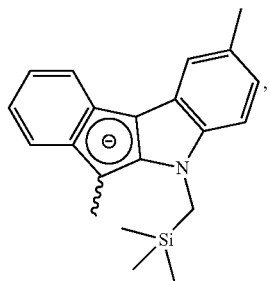

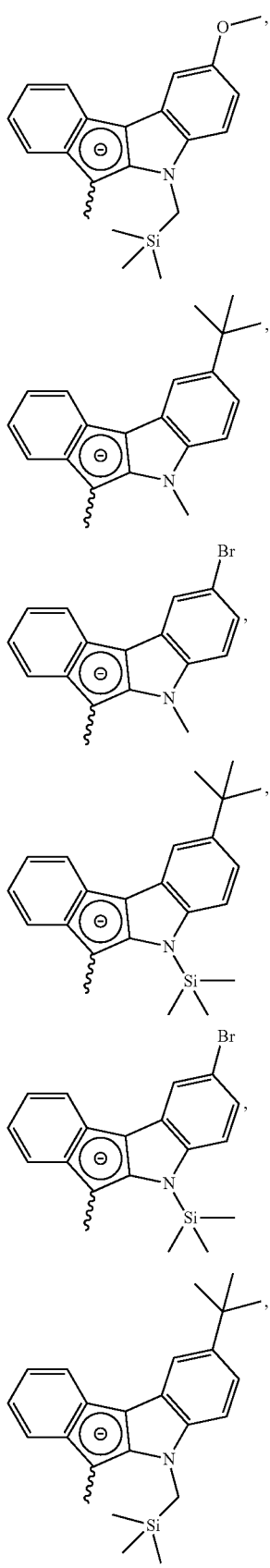

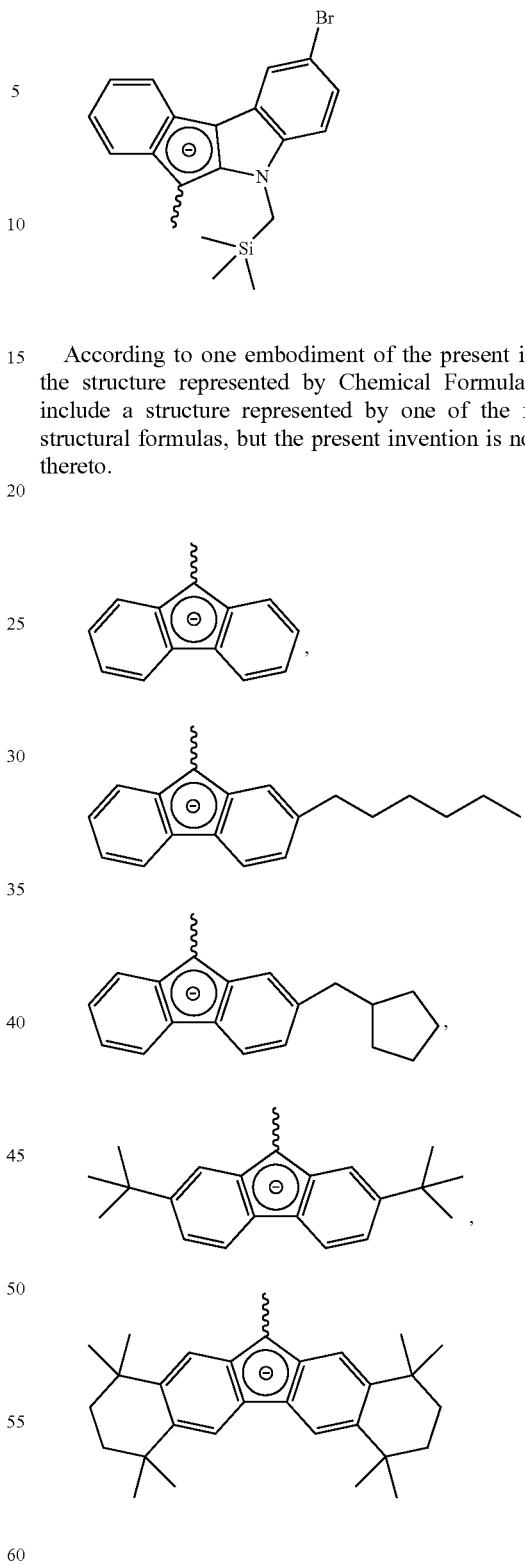

According to one embodiment of the present invention, the structure represented by Chemical Formula 2c may include a structure represented by one of the following structural formulas, but the present invention is not limited thereto.

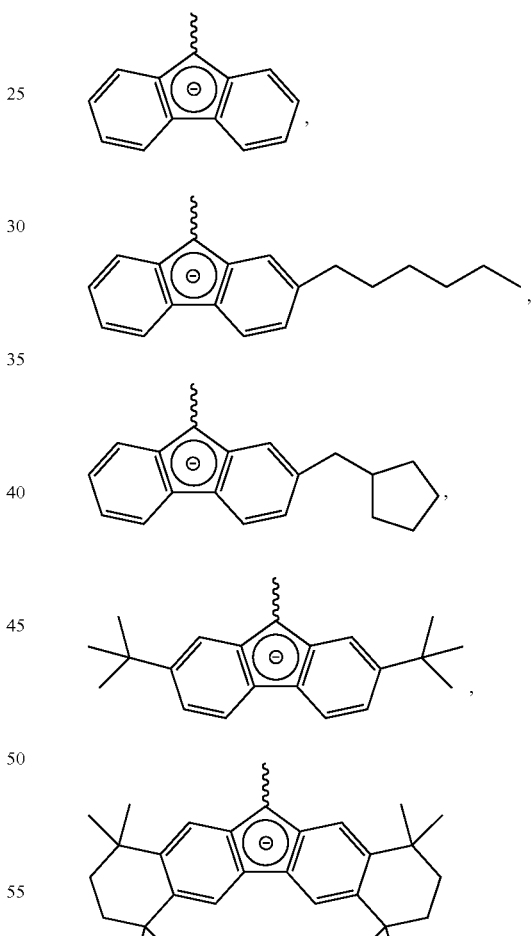

According to one embodiment of the present invention, a specific example of the first metallocene compound represented by Chemical Formula 1 may include a compound represented by one of the following structural formulas, but is not limited thereto.

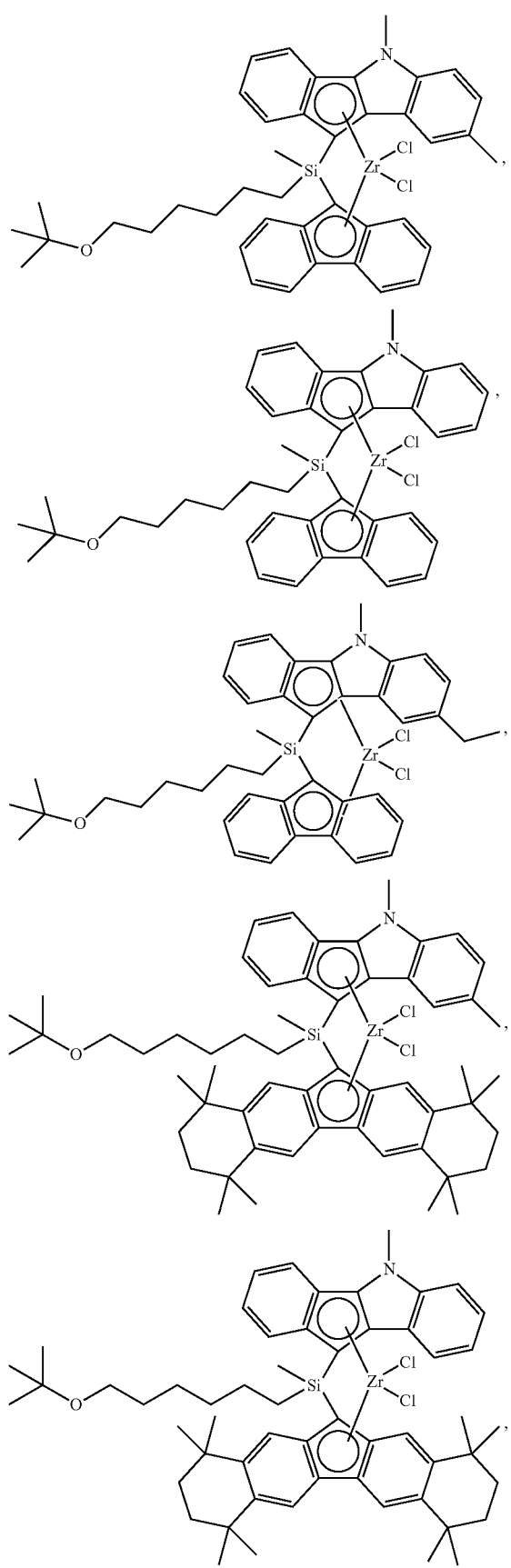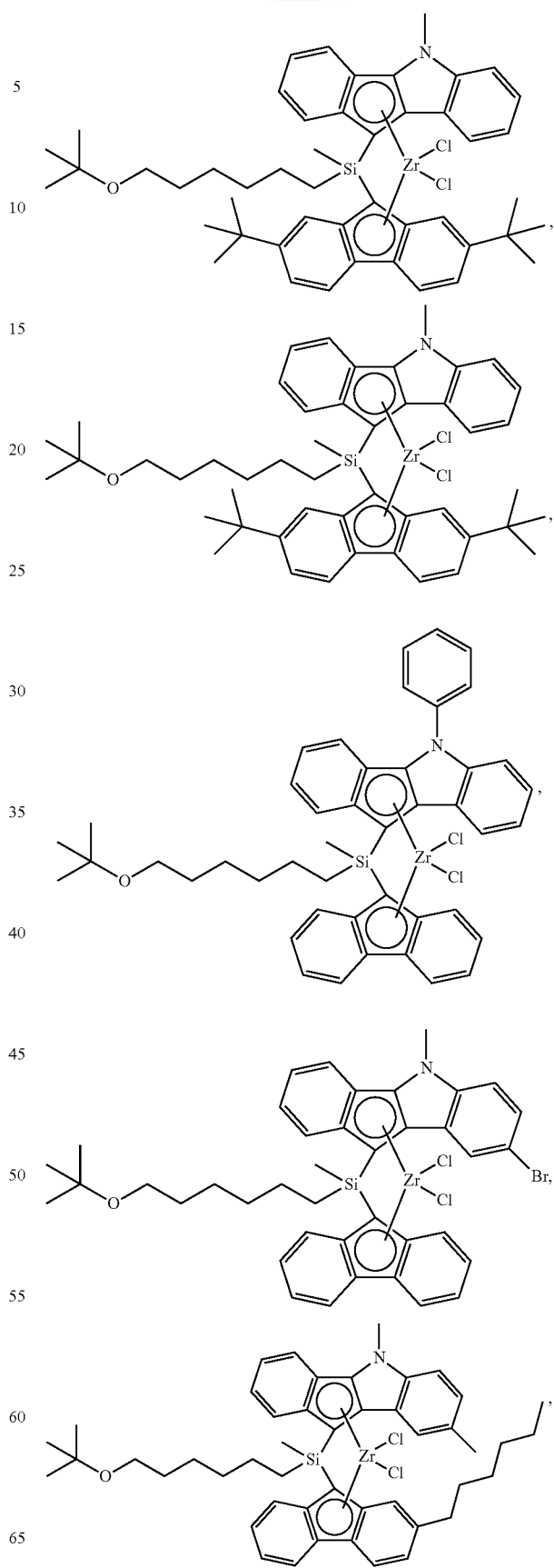

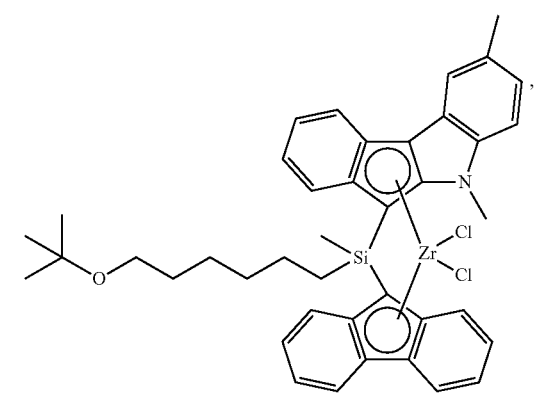
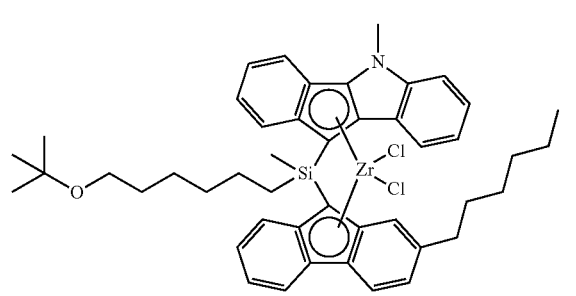
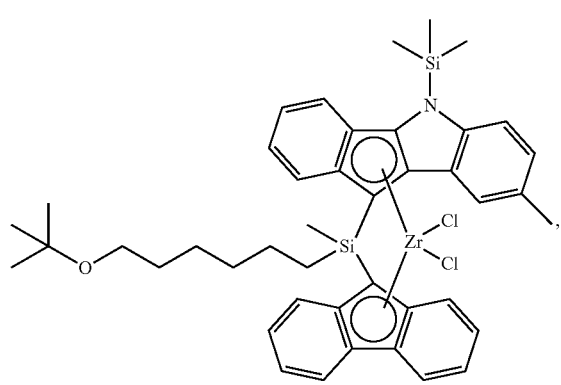
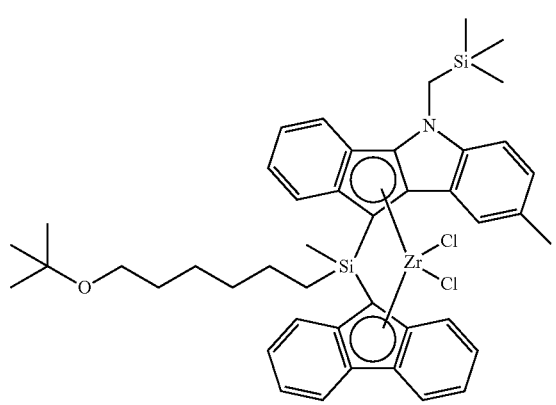
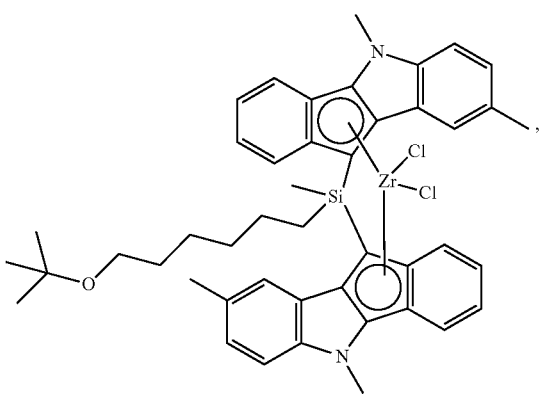
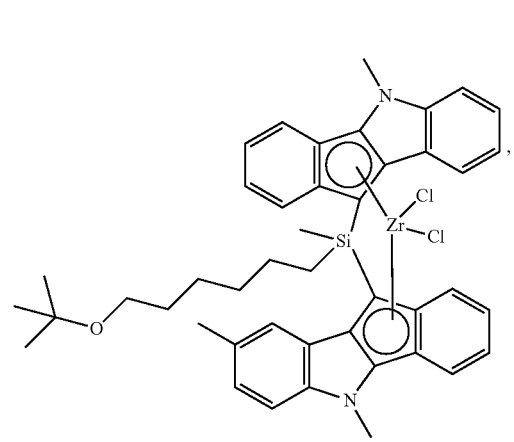
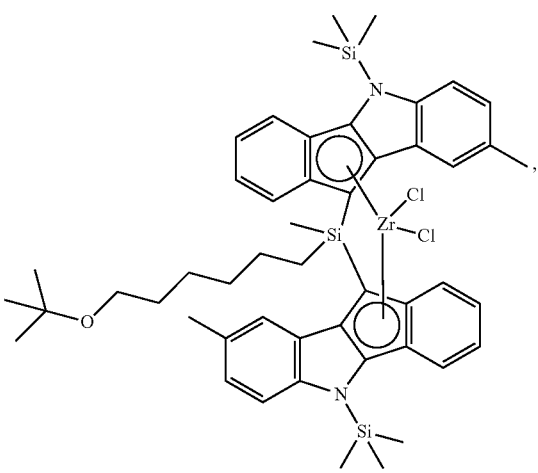

-continued

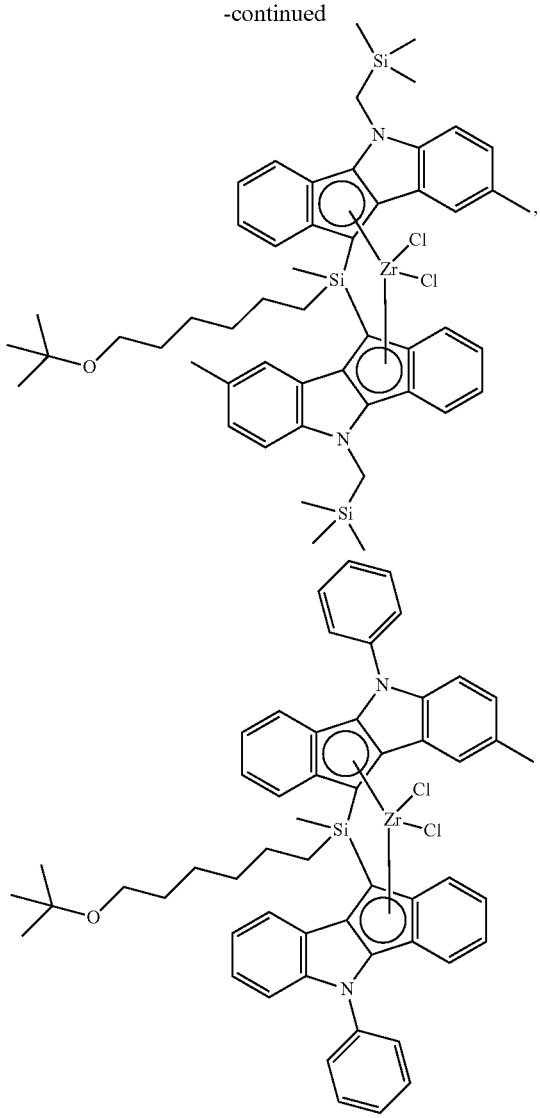

The first metallocene compound of Chemical Formula 1 has a superior activity and can polymerize an ethylene/alpha-olefin copolymer having a high molecular weight. In particular, it can exhibit a high polymerization activity even when it is used in the state of being supported on a support, and thus can produce an ethylene/alpha-olefin copolymer having a ultra-high molecular weight.

Further, even when the polymerization reaction is carried out in the presence of hydrogen in order to produce an ethylene/alpha-olefin copolymer having both a high molecular weight and a broad molecular weight distribution, the first metallocene compound of Chemical Formula 1 according to the present invention exhibits a low hydrogen reactivity and thus can still polymerize an ethylene/alpha-olefin copolymer having an ultra-high molecular weight with a high activity. Therefore, even when it is used as a hybrid with a catalyst having different characteristics, it is possible to produce an ethylene/alpha-olefin copolymer satisfying the characteristics of high molecular weight without lowering the activity, resulting in the easy preparation of an ethylene/alpha-olefin copolymer having broad molecular weight distribution while containing the ethylene/alpha-olefin copolymer having high molecular weight.

The first metallocene compound of Chemical Formula 1 can be prepared by connecting an indenoindole derivative and/or a fluorene derivative via a bridging compound to prepare a ligand compound, then introducing a metal precursor compound therein to perform a metallation. The method for producing the first metallocene compound will be specifically explained in the examples to be described below.

The compound represented by Chemical Formula 3 can be, for example, a compound represented by one of the following structural formulas, but is not limited thereto.

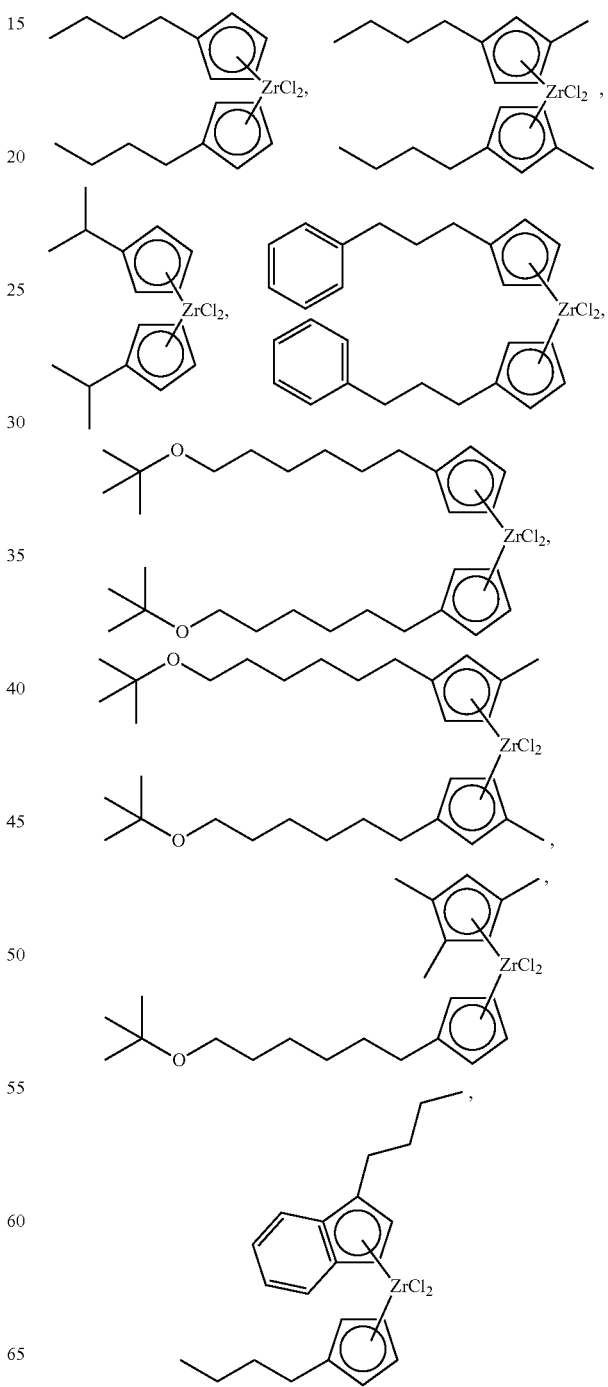

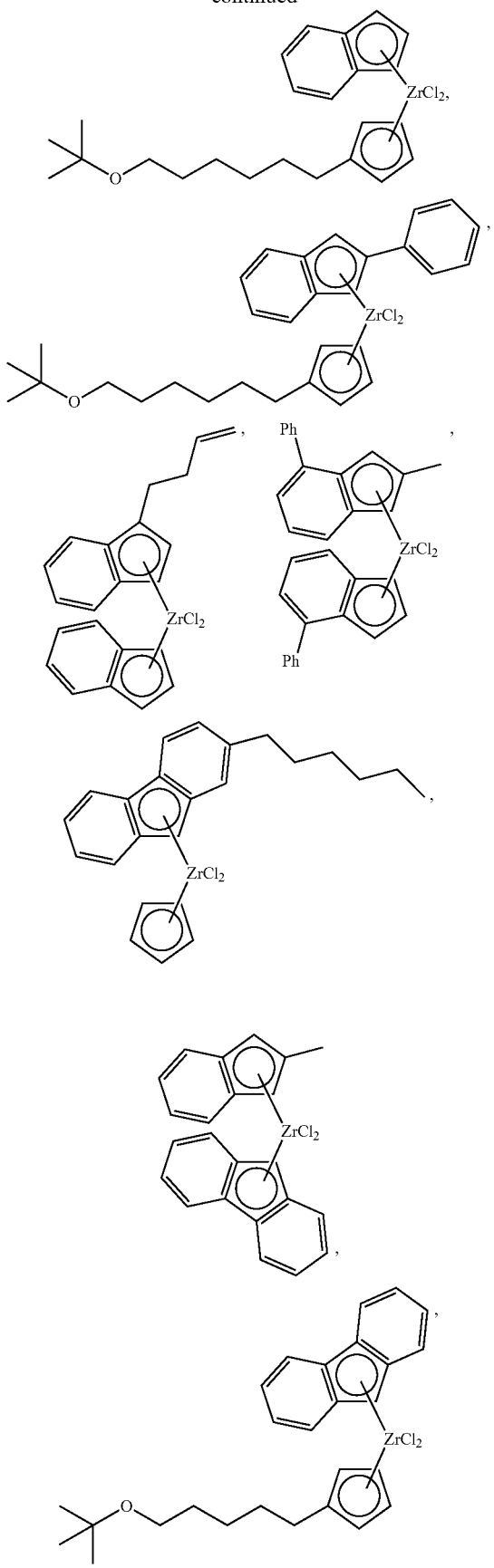
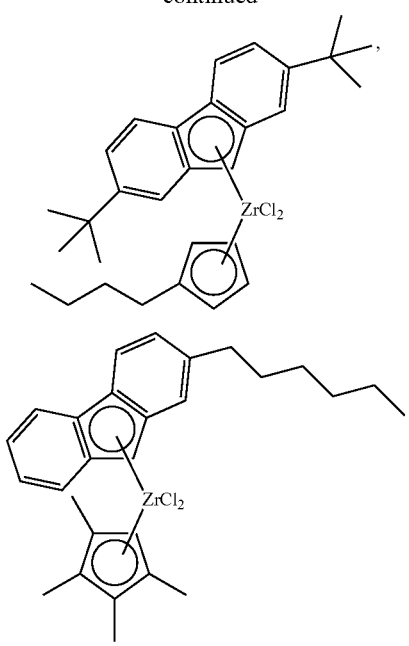

In Chemical Formula 4, when m is 1, it means a structure in which the $Cp^3R^c$ ring, the $Cp^4R^d$ ring or the $Cp^4R^d$ ring and the $M^2$ are crosslinked via $B^1$, and when m is 0, it means a non-crosslinked compound structure.

The compound represented by Chemical Formula 4 may be, for example, a compound represented by one of the following structural formulas, but is not limited thereto.

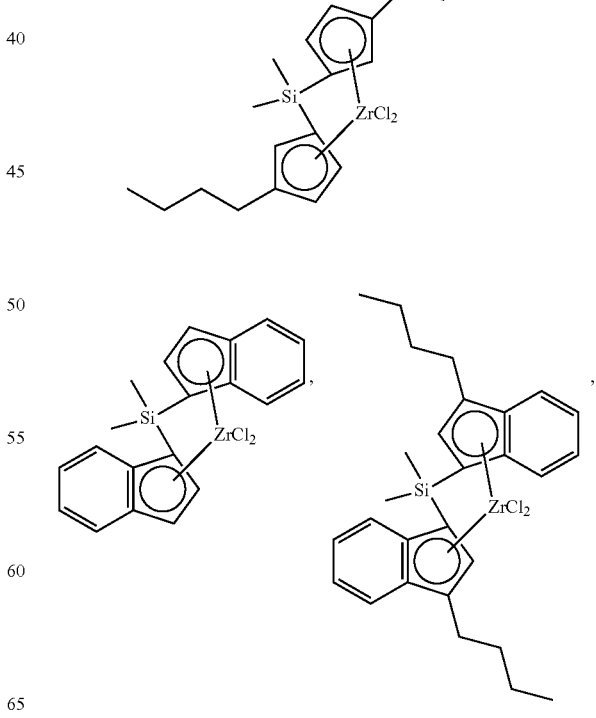

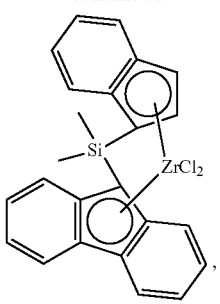
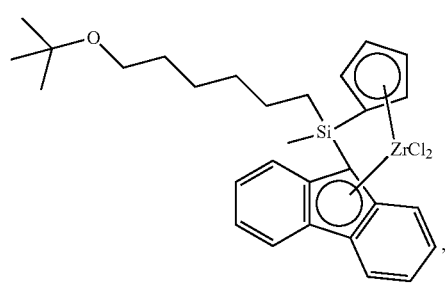
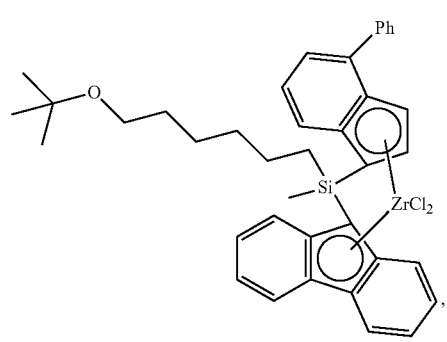
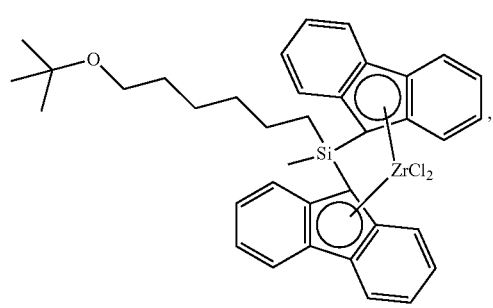
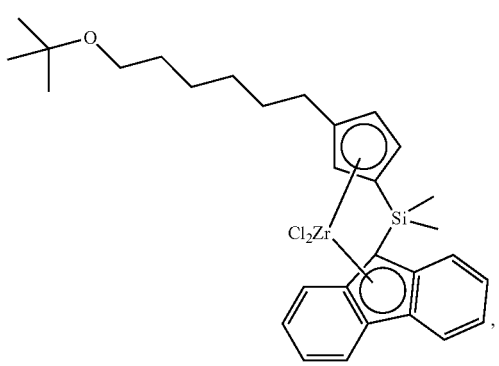
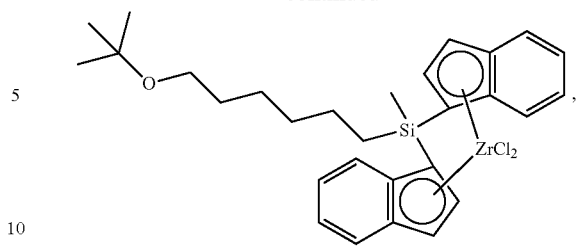
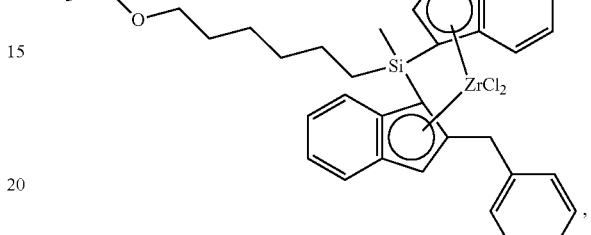
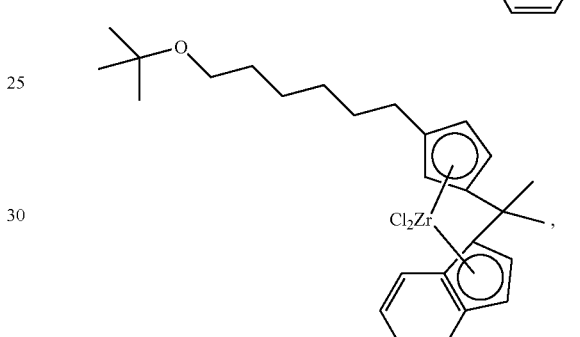
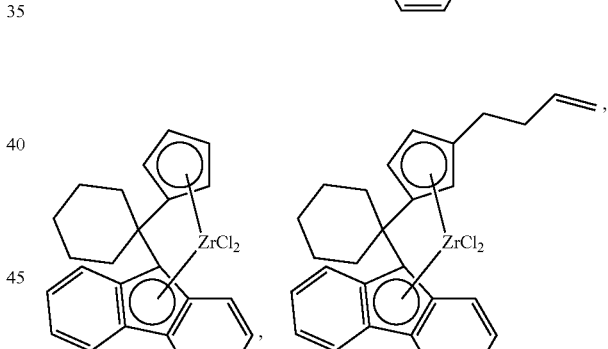
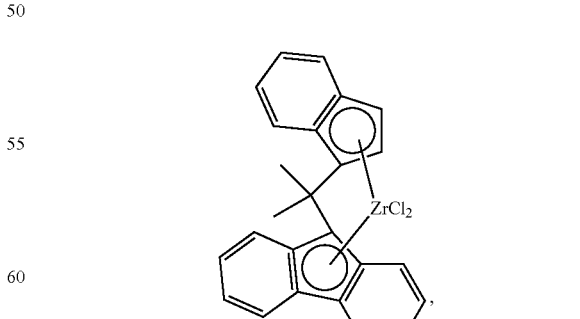
Further, the compound represented by Chemical Formula 5 may be, for example, a compound represented by the following structural formulas, but is not limited thereto.

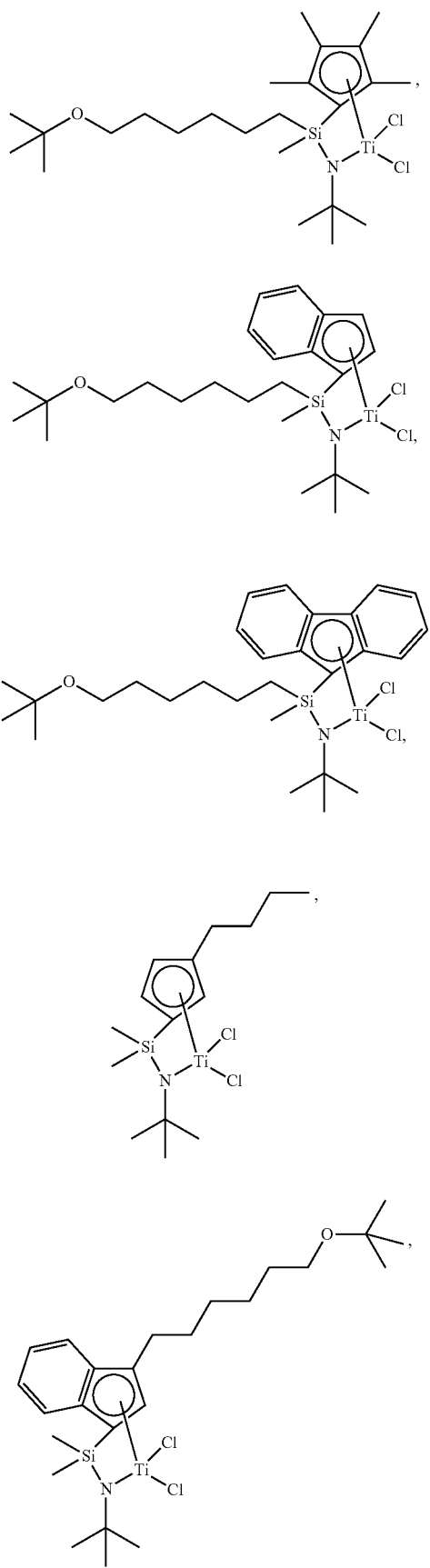

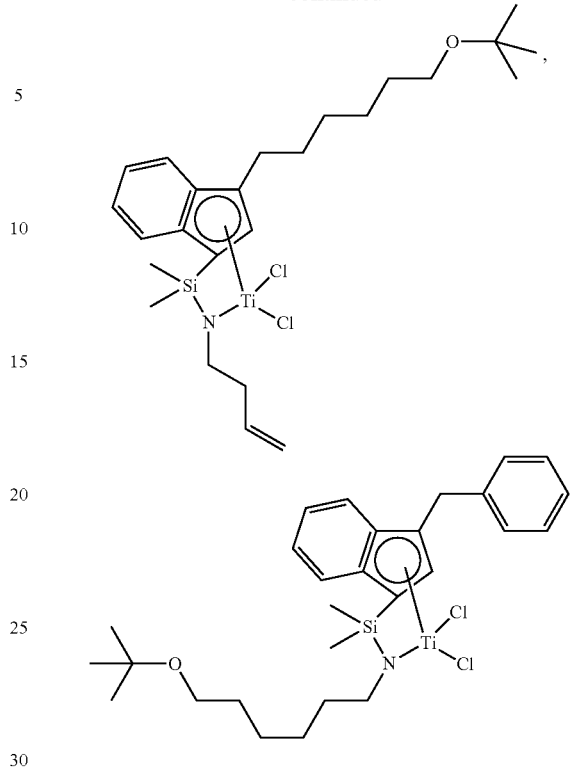

The metallocene catalyst used in the present invention may be a metallocene catalyst in which at least one of the first metallocene compounds represented by Chemical Formula 1 and at least one of the second metallocene compounds selected among the compounds represented by Chemical Formulas 3 to 5 are supported on a support together with a cocatalyst compound.

In addition, the supported metallocene catalyst can induce the generation of LCB (Long Chain Branch) in the ethylene/alpha-olefin copolymer to be produced.

In the supported metallocene catalyst according to the present invention, the cocatalyst to be supported on the support for activation of the metallocene compound is an organometallic compound containing a Group 13 metal, and it is not particularly limited as long as it can be used when polymerizing the olefin in the presence of a general metallocene catalyst.

Specifically, the cocatalyst compound may include at least one of an aluminum-containing primary cocatalyst of Chemical Formula 6 below and a boron-containing secondary cocatalyst of Chemical Formula 7 below.

$$—[Al(R_{18})—O—]_k—$$ [Chemical Formula 6]

in Chemical Formula 6, $R_{18}$ is each independently a halogen, a halogen-substituted or unsubstituted hydrocarbyl group having 1 to 20 carbon atoms, and k is an integer of 2 or more, $$T^+[BG_4]^-$$ [Chemical Formula 7]

in Chemical Formula 7, $T^+$ is a +1 valent polyatomic ion, B is boron in an oxidation state of +3, and G is each independently selected from the group consisting of hydride, dialkylamido, halide, alkoxide, aryloxide, hydrocarbyl, halocarbyl and halo-substituted hydrocarbyl, wherein the G has 20 or less carbon atoms, provided that G is halide at one or less position.

By using the first and the second cocatalysts as above, the polyolefins finally prepared may have more uniform molecular weight distribution, while the polymerization activity can be enhanced.

The first cocatalyst of Chemical Formula 6 may be an alkylaluminoxane-based compound wherein the repeating units are combined into a linear, circular or network form. Specific examples of the first cocatalyst include methylaluminoxane (MAO), ethylaluminoxane, isobutylaluminoxane, butylaluminoxane, and the like.

Further, the second cocatalyst of Chemical Formula 7 may be a tri-substituted ammonium salt, or a dialkylammonium salt, or a tri-substituted phosphate type borate compound. Specific examples of the second cocatalyst include a borate-based compound in the form of a trisubstituted ammonium salt, such as trimethylammonium tetraphenylborate, methyl dioctadecylammonium tetraphenylborate, triethylammonium tetraphenylborate, tripropylammonium tetraphenylborate, tri(n-butyl)ammonium tetraphenylborate, methyltetradecyloctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl) borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate or N,N-dimethyl-(2,4,6-trimethylanilinium)tetrakis-(2,3,4,6-tetrafluorophenyl)borate and the like; a borate-based compound in the form of a dialkylammonium salt, such as dioctadecylammonium tetrakis(pentafluorophenyl)borate, ditetradecylammonium tetrakis(pentafluorophenyl)borate or dicyclohexylammonium tetrakis(pentafluorophenyl)borate; or a borate-based compound in the form of a trisubstituted phosphonium salt, such as triphenylphosphonium tetrakis(pentafluorophenyl)borate, methyldioctadecylphosphonium tetrakis(pentafluorophenyl)borate or tri(2,6-dimethylphenyl)phosphonium tetrakis(pentafluorophenyl)borate.

In the supported metallocene catalyst according to the present invention, the mass ratio between the whole transition metals contained in the first metallocene compound represented by Chemical Formula 1 or the second metallocene compound represented by Chemical Formulas 3 to 5 and the support may be 1:10 to 1:1000. When the support and the metallocene compound are contained in the range of the above mass ratio, an optimal shape can be provided. The mass ratio of the cocatalyst compound to the support may be 1:1 to 1:100.

In the supported metallocene catalyst according to the present invention, as the support, a support containing a hydroxy group on its surface can be used, and preferably a support having highly reactive hydroxy group and siloxane group, of which the surface is dried and removed of moisture can be used.

For example, silica, silica-alumina, silica-magnesia or the like, which are dried at high temperature, can be used, and they may typically contain oxides, carbonates, sulfates, and nitrates such as $Na_2O$, $K_2CO_3$, $BaSO_4$ and $Mg(NO_3)_2$.

The drying temperature of the support is preferably 200 to 800° C., more preferably 300 to 600° C., and most preferably 300 to 400° C. If the drying temperature of the support is lower than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

On the other hand, the ethylene/alpha-olefin copolymer according to the present invention can be produced by polymerizing ethylene and alpha-olefin in the presence of the supported metallocene catalyst described above.

The polymerization reaction may be carried out by copolymerizing ethylene and alpha-olefin, using a continuous slurry polymerization reactor, a loop slurry reactor, a gas phase reactor, or a solution reactor.

The polymerization temperature may be about 25 to about 500° C., preferably about 25 to about 200° C., and more preferably about 50 to about 150° C. Further, the polymerization pressure may be from about 1 to about 100 $Kgf/cm^2$, preferably from about 1 to about 50 $Kgf/cm^2$, more preferably from about 5 to about 30 $Kgf/cm^2$.

The supported metallocene catalyst can be injected after being dissolved or diluted in an aliphatic hydrocarbon solvent having 5 to 12 carbon atoms such as pentane, hexane, heptane, nonane, decane, and isomers thereof, an aromatic hydrocarbon solvent such as toluene and benzene, or a hydrocarbon solvent substituted with chlorine atom such as dichloromethane and chlorobenzene. It is preferable that the solvent is used after a small amount of water, air or the like acting as a catalyst poison is removed by treating with a small amount of alkyl aluminum. It may also be performed using an additional cocatalyst.

The ethylene/alpha-olefin copolymer according to the present invention can be produced by copolymerizing ethylene and alpha-olefin monomers, using a catalyst of Chemical Formulas 3 to 5 which mainly polymerizes low molecular weight polymer chains, and a catalyst of Chemical Formula 1 which mainly polymerizes high molecular weight polymer chains. Due to the interaction between these two or more catalysts, it is possible to obtain a polymer containing a higher content of polymer chains in a high molecular weight region while having a broad molecular weight distribution as a whole.

Advantageous Effects

The ethylene/alpha-olefin copolymer according to the present invention has excellent processability and surface characteristics and thus can be usefully applied to various products.

BRIEF DESCRIPTION OF THE DRAWINGS

FIG. 1 shows an observed image of the spherulite of the polymer prepared in one example of the present invention.

FIGS. 2 and 3 show observed images of the spherulite of the polymer prepared in a comparative example of the present invention.

DETAILED DESCRIPTION OF THE EMBODIMENTS

Hereinafter, preferred Examples are provided for better understanding of the present invention. However, these Examples are for illustrative purposes only and the invention are not intended to be limited by these Examples.

Preparation Example 1

Step 1) Preparation of a Ligand Compound 2 g of fluorene was dissolved in 5 mL of MTBE and 100 mL of hexane, and 5.5 mL of 2.5 M n-BuLi hexane solution was added dropwise in a dry ice/acetone bath and stirred overnight at room temperature. 3.6 g of (6-(tert-butoxy) hexyl)dichloro(methyl)silane was dissolved in 50 mL of hexane, and fluorene-Li slurry was transferred under a dry ice/acetone bath for 30 minutes and stirred overnight at room temperature. At the same time, 5,8-dimethyl-5,10-dihydroindeno[1,2-b]indole (12 mmol, 2.8 g) was dissolved in 60 mL of THF, and 5.5 mL of 2.5 M n-BuLi hexane solution was added dropwise in a dry ice/acetone bath and stirred overnight at room temperature. The reaction solution of fluorene and (6-(tert-butoxy)hexyl)dichloro(methyl)silane was subjected to NMR sampling to confirm the completion of the reaction, and then 5,8-dimethyl-5,10-dihydroindeno[1,2-b]indole-Li solution was transferred under dry ice/acetone bath. The mixture was stirred overnight at room temperature. After reaction, the reaction mixture was extracted with ether/water and the remaining moisture in the organic layer was removed with $MgSO_4$ to give the ligand compound (Mw 597.90, 12 mmol), and it could be confirmed by 1H-NMR that two isomers were produced.

$^1$H NMR (500 MHz, $d_6$-benzene): −0.30~−0.18 (3H, d), 0.40 (2H, m), 0.65~1.45 (8H, m), 1.12 (9H, d), 2.36~2.40 (3H, d), 3.17 (2H, m), 3.41~3.43 (3H, d), 4.17~4.21 (1H, d), 4.34~4.38 (1H, d), 6.90~7.80 (15H, m)

Step 2) Preparation of Metallocene Compound 7.2 g (12 mmol) of the ligand compound synthesized in the step 1 was dissolved in 50 mL of diethylether, and 11.5 mL of 2.5 M n-BuLi hexane solution was added dropwise in a dry ice/acetone bath and stirred overnight at room temperature. The mixture was dried under vacuum to give sticky oil having a brown color. This oil was dissolved in toluene to give a slurry. $ZrCl_4(THF)_2$ was prepared, and toluene (50 mL) was added thereto to prepare a slurry. The toluene slurry of $ZrCl_4(THF)_2$ (50 mL) was transferred in a dry ice/acetone bath. As the mixture was stirred overnight at room temperature, the color was changed to violet. The reaction solution was filtered to remove LiCl. The filtrate was dried under vacuum to remove toluene, hexane was added thereto, and the mixture was sonicated for 1 hour. The slurry was filtered to give 6 g of metallocene compound (Mw 758.02, 7.92 mmol, yield 66 mol %) having a dark violet color as a filtered solid. Two isomers were observed through $^1$H-NMR.

$^1$H NMR (500 MHz, $CDCl_3$): 1.19 (9H, d), 1.71 (3H, d), 1.50~1.70 (4H, m), 1.79 (2H, m), 1.98~2.19 (4H, m), 2.58 (3H, s), 3.38 (2H, m), 3.91 (3H, d), 6.66~7.88 (15H, m)

Preparation Example 2 t-Butyl-O—$(CH_2)_6$—Cl was prepared using 6-chlorohexanol according to the method described in Tetrahedron Lett. 2951 (1988), and then reacted with NaCp to obtain t-Butyl-O—$(CH_2)_6$—$C_5H_5$ (yield 60%, b.p. 80° C./0.1 mmHg).

Also, t-Butyl-O—$(CH_2)_6$—$C_5H_5$ was dissolved in THF at −78° C., n-BuLi was slowly added thereto, and the mixture was warmed up to room temperature and then reacted for 8 hours. Again at a temperature of −78° C., thus prepared lithium salt solution was slowly added to a suspension solution of $ZrCl_4(THF)_2$ (1.70 g, 4.50 mmol)/THF (30 mL) and the mixture was further reacted at room temperature for 6 hours.

All volatile substances were dried under vacuum and hexane solvent was added to the resulting oily liquid substance, which was then filtered. The filtrate was dried under vacuum, and hexane was added to induce a precipitate at a low temperature (−20° C.). The resulting precipitate was filtered at a low temperature to give [tBu-O—$(CH_2)_6$—$C_5H_4]_2ZrCl_2$ compound (yield 92%) as a white solid.

$^1$H NMR (300 MHz, $CDCl_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR ($CDCl_3$): 135.09, 116.66, 112.28, 72.42, 61.52, 30.66, 30.61, 30.14, 29.18, 27.58, 26.00.

Preparation Example 3

Step 1) Drying of Support

Silica (SYLOPOL 948 manufactured by Grace Davison Co.) was dehydrated at a temperature of 400° C. for 15 hours in a vacuum state.

Step 2) Preparation of Supported Support 10 g of the dried silica of the step 1 was introduced to a glass reactor to which 100 mL of toluene was additionally added and stirred. 50 mL of 10 wt % methylaluminoxane (MAO)/toluene solution was added thereto, and the mixture was slowly reacted while stirring at 40° C. Thereafter, the reaction solution was washed with a sufficient amount of toluene to remove an unreacted aluminum compound, and the remaining toluene was removed under reduced pressure. 100 mL of toluene was added thereto again, to which 0.25 mmol of the metallocene catalyst prepared in Preparation Example 1 dissolved in toluene was added together and reacted for 1 hour. After completion of the reaction, 0.25 mmol of the metallocene catalyst prepared in Preparation Example 2 dissolved in toluene was added and further reacted for 1 hour. After completion of the reaction, the stirring was stopped and the toluene was removed by layer separation, to which 1.0 mmol of anilinium borate (N,N-dimethylanilinium tetrakis(pentafluorophenyl)borate, AB) was added and stirred for 1 hour. Toluene was then removed at 50° C. under reduced pressure to give the supported catalyst.

Example 1: Ethylene/Alpha-Olefin Copolymer 50 mg of the supported catalyst prepared in Preparation Example 3 was weighed in a dry box and introduced to a 50 mL glass bottle. The bottle was sealed with a rubber diaphragm and taken out of the dry box to prepare a catalyst for injection. The polymerization was performed in a 2 L metal alloy reactor equipped with a mechanical stirrer and capable of controlling temperature and being used under high pressure.

1 L of hexane containing 1.0 mmol of triethylaluminum, and 1-hexene (5 mL) were introduced to the reactor, and then the prepared supported catalyst was introduced thereto without contact with air. Then, the polymerization was carried out for an hour at 80° C., while continuously providing a gaseous ethylene monomer under a pressure of 9 Kgf/cm². The polymerization was terminated by stopping the stirring and then exhausting ethylene. After most of the polymerization solvent thus obtained was filtered off, the resulting polymer was dried at 80° C. vacuum oven for 4 hours.

Example 2: Ethylene/Alpha-Olefin Copolymer

An ethylene/alpha-olefin copolymer was prepared in the same manner as in Example 1, except that the addition amount of 1-hexene was less than 5 mL.

Comparative Example

The following products were used as comparative examples.

0.0125% using PL-SP260 at 160° C. for 10 hours, and the number average molecular weight and the weight average molecular weight were measured at a temperature of 160° C. using PL-GPC220. The molecular weight distribution was indicated by the ratio of the weight average molecular weight and the number average molecular weight.

5) Size of spherulite: The surface of the sample was observed with a microscope. Specifically, the diameter of the spherulite was measured after the ethylene/alpha-olefin copolymer was completely melted at 190° C. and then reached the crystallization temperature at a speed of 10° C./min. Herein, the diameter of the spherulite is the size when each spherulite overlaps according to the growth of the spherulite.

6) Half crystallization time ($T\frac{1}{2}$ at 123° C.): The half crystallization time was measured using a differential scanning calorimetry (DSC), and is the time when it is a half of the peak value in the heat quantity that appears after the ethylene/alpha-olefin copolymer is completely melted at 190° C., quenched (80° C./min) up to a crystallization temperature (123° C.).

The results are shown in Table 1 below. In addition, the observation results of the spherulite of each copolymer are shown in FIGS. 1 to 3.

TABLE 1

|  | Unit | Example 1 | Example 2 | Comparative Example 1 | Comparative Example 2 | Comparative Example 3 |
| --- | --- | --- | --- | --- | --- | --- |
| Density | g/cm³ | 0.962 | 0.957 | 0.956 | 0.957 | 0.955 |
| $MI_{2.16}$ | — | 5 | 7.52 | 6.94 | 8.04 | 7.27 |
| $MFRR(MI_5/MI_{2.16})$ | — | 3.88 | 3.58 | 2.62 | 2.87 | 2.89 |
| Molecular weight (MW, ×10⁴) | g/mol | 8.6 | 8.2 | 6.9 | 7.3 | 8.0 |
| Molecular weight distribution(MWD) | — | 5.14 | 3.96 | 2.54 | 5.18 | 4.53 |
| Presence of LCB | — | ○ | ○ | X | X | X |
| Size of spherulite | Mm | <20 | <20 | >20 | >20 | >20 |
| $T_{1/2}$ at 123° C. | Min | 2.5 | 4.1 | 1.8 | 8.9 | 9.2 |

Comparative Example 1: 2010 J (Lotte Chemical)
Comparative Example 2: LUTENE-H ME 8000 (LG Chem)
Comparative Example 3: Rigidex® HD 6070 UA (INEOS)

Experiment & Example: Evaluation of Physical Properties of Polymer

The polymers prepared in the above Examples and Comparative Examples were evaluated for physical properties in the following manners.
1) Density: ASTM 1505
2) Melt Flow index (MFR, 5 kg/2.16 kg): measurement temperature 190° C., ASTM D1238
3) MFRR ($MFR_5/MFR_{2.16}$): the ratio where $MFR_5$ melt index (MI, load: 5 kg) is divided by $MFR_{2.16}$ (MI, load: 2.16 kg).
4) Mn, Mw, MWD, GPC curve: The sample was melted and pre-treated in 1,2,4-trichlorobenzene containing BHT As shown in Table 1 above, it was confirmed that the size of the spherulite of Examples according to the present invention was less than 20 μm, while the size of the spherulite of Comparative Examples exceeded 20 μm. It was also confirmed that the half crystallization speed was significantly faster than that of Comparative Example 3 having a molecular weight and a molecular weight distribution similar to those of Examples of the present invention.

The invention claimed is:
1. An ethylene/alpha-olefin copolymer having:
a weight average molecular weight (g/mol) of 50,000 to 150,000,
a molecular weight distribution (Mw/Mn) of 3 to 8,
a density (g/cm³) of 0.940 to 0.970,
a diameter of spherulite of 20 μm or less, and
a half crystallization time of 6 minutes or less measured at 123° C.

2. The ethylene/alpha-olefin copolymer according to claim 1,
wherein the polymer chains of the ethylene/alpha-copolymer gathered into bundles to form lamellae, and the spherulite is defined by the three-dimensional growth of the lamellae.

3. The ethylene/alpha-olefin copolymer according to claim 1,
wherein the half crystallization time measured at 123° C. is 5 minutes or less.

4. The ethylene/alpha-olefin copolymer according to claim 1,
wherein $MFRR_{2.16}$ (melt flow index measured at 190° C. under a lead of 2.16 kg according to ASTM D 1238) is 0.5 to 10.

5. The ethylene/alpha-olefin copolymer according to claim 1,
wherein $MFRR_{5/2.16}$ (value where the melt flow index measured at 190° C. under a load of 5 kg is divided by the melt flow index measured at 190° C. under a lead of 2.16 kg according to ASTM D 1238) is 3 to 8.

6. The ethylene/alpha-olefin copolymer according to claim 1,
wherein the alpha-olefin is one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene and 1-eicosene.

7. The ethylene/alpha-olefin copolymer according to claim 1,
wherein the ethylene/alpha-olefin copolymer is produced by polymerizing ethylene and alpha-olefin in the presence of one or more of the first metallocene compounds represented by Chemical formula 1 below; and one or more of the second metallocene compounds selected from the compounds represented by Chemical Formulas 3 to 5 below:

[Chemical Formula 1]

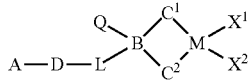

in Chemical Formula 1,
A is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{3-20}$ heterocycloalkyl, or $C_{5-20}$ heteroaryl;
D is —O—, —S—, —N(R)— or —Si(R)(R')— wherein R and R' are the same as or different from each other and each independently hydrogen, halogen, $C_{1-20}$ alkyl, $C_{2-20}$ alkenyl, or $C_{6-20}$ aryl;
L is $C_{1-10}$ linear or branched alkylene;
B is carbon, silicon or germanium;
Q is hydrogen, halogen, $C_{1-20}$ alkyl, $C_{2-20}$ alkenyl, $C_{6-20}$ aryl, $C_{7-20}$alkylaryl or $C_{7-20}$ arylalkyl;
M is a Group 4 transition metal;
$X^1$ and $X^2$ are the same as or different from each other and are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;
$C^1$ and $C^2$ are the same as or different from each other and each independently represented by one of the following chemical formulas 2a, 2b or 2c, provided that cases where both $C^1$ and $C^2$ are Chemical Formula 2c, are excluded,

[Chemical Formula 2a]

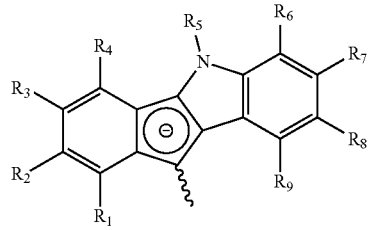

[Chemical Formula 2b]

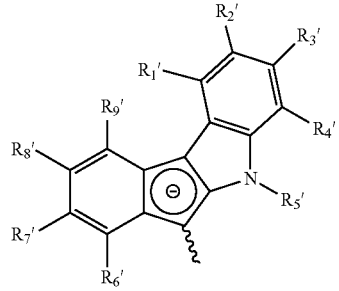

[Chemical Formula 2c]

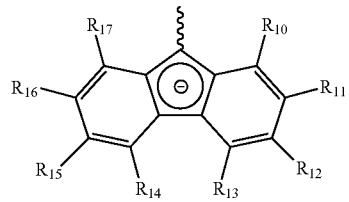

in Chemical Formulas 2a, 2b and 2c,
$R_1$ to $R_{17}$ and $R_1'$ to $R_9'$ are same as or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-20}$ alkylaryl, or $C_{7-20}$ arylalkyl, and adjacent two or more of the $R_{10}$ to $R_{17}$ are connected to each other to form a substituted or unsubstituted aliphatic or aromatic ring;

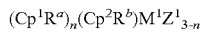 [Chemical Formula 3]

in Chemical Formula 3,
$M^1$ is a Group 4 transition metal;
$Cp^1$ and $Cp^2$ are the same as or different from each other and are each independently any one selected from the group consisting of cyclopentadienyl, indenyl, 4,5,6,7-tetrahydro-1-indenyl, and fluorenyl radicals, which may be substituted with a hydrocarbon having 1 to 20 carbon atoms;
$R^a$ and $R^b$ are the same as or different from each other and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;
$Z_1$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_7$-40 arylalkoxy;
n is 1 or 0;

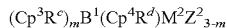 [Chemical Formula 4]

in Chemical Formula 4, $M^2$ is a Group 4 transition metal;

$Cp^3$ and $Cp^4$ are the same as or different from each other and are each independently any one selected from the group consisting of cyclopentadienyl, indenyl, 4,5,6,7-tetrahydro-1-indenyl and fluorenyl radicals, which may be substituted with a hydrocarbon having 1 to 20 carbon atoms;

$R^c$ and $R^d$ are the same as or different from each other and are each independently, hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^2$ is a halogen atom, $C_{1-20}$ alkyl, $C_{2-10}$ alkenyl, $C_{7-40}$ alkyl aryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^1$ is at least one of carbon, germanium, silicon, phosphorus, or nitrogen atom containing radicals, which cross-link $Cp^3R^c$ ring and $Cp^4R^d$ ring or which cross-link one $Cp^4R^d$ ring to $M^2$, a combination thereof;

m is 1 or 0;

$(Cp^5R^e)B^2(J)M^3Z^3{}_2$         [Chemical Formula 5]

in Chemical Formula 5, $M^3$ is a Group 4 transition metal;

$Cp^5$ is any one selected from the group consisting of cyclopentadienyl, indenyl, 4,5,6,7-tetrahydro-1-indenyl and fluorenyl radicals, which may be substituted with a hydrocarbon having 1 to 20 carbon atoms;

$R^e$ is hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^3$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^2$ is at least one of carbon, germanium, silicon, phosphorus, or nitrogen atom containing radicals, which cross-link $Cp^5R^e$ ring and J, or a combination thereof;

J is any one selected from the group consisting of $NR^f$, O, $PR^f$ and S, and the $R^f$ is $C_{1-20}$ alkyl, aryl, substituted alkyl or substituted aryl.

* * * * *